(12) United States Patent
Reisinger

(10) Patent No.: US 8,028,021 B2
(45) Date of Patent: Sep. 27, 2011

(54) TECHNIQUES FOR PROVIDING PRESENTATION MATERIAL IN AN ON-GOING VIRTUAL MEETING

(75) Inventor: Josef Reisinger, Bornheim (DE)

(73) Assignee: International Business Machines Corporation, Armonk, NY (US)

( * ) Notice: Subject to any disclaimer, the term of this patent is extended or adjusted under 35 U.S.C. 154(b) by 687 days.

(21) Appl. No.: 12/107,834

(22) Filed: Apr. 23, 2008

(65) Prior Publication Data

US 2009/0271479 A1    Oct. 29, 2009

(51) Int. Cl.
*G06F 15/16*  (2006.01)
*G06F 3/00*   (2006.01)
*G06F 3/048*  (2006.01)

(52) U.S. Cl. ........ 709/204; 709/205; 709/206; 715/753; 715/757

(58) Field of Classification Search .......... 709/204–207; 715/753–758
See application file for complete search history.

(56) References Cited

U.S. PATENT DOCUMENTS

| | | | |
|---|---|---|---|
| 6,253,167 B1 | 6/2001 | Matsuda et al. | |
| 7,086,005 B1 * | 8/2006 | Matsuda | 715/706 |
| 2001/0046228 A1 * | 11/2001 | Tahtinen et al. | 370/389 |
| 2002/0095375 A1 | 7/2002 | Taneda et al. | |
| 2004/0128350 A1 | 7/2004 | Topfl et al. | |
| 2006/0178968 A1 | 8/2006 | Jung et al. | |
| 2007/0260687 A1 * | 11/2007 | Rao et al. | 709/204 |
| 2007/0268299 A1 | 11/2007 | Jung et al. | |
| 2007/0271301 A1 | 11/2007 | Klive | |
| 2008/0071750 A1 | 3/2008 | Schloter | |
| 2008/0307473 A1 * | 12/2008 | Allen | 725/104 |
| 2009/0017916 A1 * | 1/2009 | Blanchard et al. | 463/42 |
| 2009/0089685 A1 * | 4/2009 | Mordecai et al. | 715/757 |
| 2009/0098524 A1 * | 4/2009 | Walton | 434/350 |
| 2009/0100352 A1 * | 4/2009 | Huang et al. | 715/757 |
| 2009/0106671 A1 * | 4/2009 | Olson et al. | 715/757 |
| 2009/0241037 A1 * | 9/2009 | Hyndman | 715/757 |
| 2010/0169837 A1 * | 7/2010 | Hyndman | 715/848 |

FOREIGN PATENT DOCUMENTS

| WO | 0178014 | 10/2001 |
|---|---|---|
| WO | WO 2009000028 A1 * | 12/2008 |

* cited by examiner

*Primary Examiner* — Brendan Higa
(74) *Attorney, Agent, or Firm* — Dillon & Yudell LLP

(57) ABSTRACT

A technique for providing presentation material in an on-going virtual meeting includes converting a real-world (RW) presentation into a virtual-world (VW) presentation. A media format of the VW presentation corresponds to a media format utilized by a target VW. The VW presentation is then stored in an RW media repository. The VW presentation is associated with an RW media uniform resource locator (URL). A VW screen control script is used to set a VW media URL associated with a VW screen parcel to the RW media URL. The VW presentation is then provided to participants of the VW meeting by accessing the RW media repository using the VW media URL.

1 Claim, 4 Drawing Sheets

| 7 sec | 5 sec | 13 sec | 5 sec | 7 sec | 9 sec |
|---|---|---|---|---|---|
| S1 | S2 | S3 | S5 | S6 | S7 |

Recorded Voice  Recorded Voice  Recorded Voice

TECHNIQUES FOR PROVIDING PRESENTATION MATERIAL IN AN ON-GOING VIRTUAL MEETING

BACKGROUND

1. Field

This disclosure relates generally to a virtual meeting and, more specifically, to techniques for providing presentation material in an on-going virtual meeting.

2. Related Art

A web browser (hereinafter "browser") is a software application that allows a user at a client computer system (hereinafter "client") to display and interact with text, images, and other information located on a web page at a website (hosted by an application server) on the World Wide Web or a local area network. Text and images on a web page may contain hyperlinks to other web pages at the same or different website. Browsers allow a user to quickly and easily access information provided on web pages at various websites by traversing hyperlinks. Browsers usually format hypertext markup language (HTML) information for display and, as such, an appearance of a web page may differ between browsers. A number of different browsers, e.g., Internet Explorer™, Mozilla Firefox™, Safari™, Opera™, and Netscape™, are currently available for personal computers. In general, browsers are the most commonly used type of hypertext transfer protocol (HTTP) user agent. While browsers are typically used to access web application servers (hereinafter "web servers") that are part of the World Wide Web, browsers can also be used to access information provided by web servers in private networks or content in file systems.

For example, a browser may be utilized by a user to interact with a virtual-world (VW) provided by a VW application server. A VW is a computer-based simulated environment that various users may inhabit and interact with each other via avatars, which are usually depicted as two-dimensional (2D) or three-dimensional (3D) graphical representations. In a typical VW, perceptual stimuli is provided (via a browser) to a user, who can manipulate (via the browser) elements of the VW and, in this manner, experience a virtual presence to some degree. The VW may simulate rules based on the real-world (RW) or some fantasy world. For example, rules associated with gravity, topography, locomotion, real-time actions, and communication may be implemented. Communication between users may range from text, graphical icons, visual gesture, sound, and occasionally forms using touch and balance senses. For example, real-time voice communication using voice over Internet protocol (VoIP) may be implemented. In general, VWs may encompass a wide variety of applications, e.g., games, computer conferencing, and text based chat-rooms.

SUMMARY

According to one aspect of the present disclosure, a technique for providing presentation material in an on-going virtual meeting includes converting a real-world (RW) presentation into a virtual-world (VW) presentation. In this case, a media format of the VW presentation corresponds to a media format utilized by a target VW. The VW presentation is then stored in an RW media repository. The VW presentation is associated with an RW media uniform resource locator (URL) and a VW screen control script is used to set a VW media URL associated with a VW screen parcel to the RW media URL. The VW presentation is then provided to participants of the VW meeting by accessing the RW media repository using the VW media URL.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 2 is a diagram of an example VW presentation that includes visual and audio information according to various embodiments of the present disclosure.

DETAILED DESCRIPTION

Figure 1:
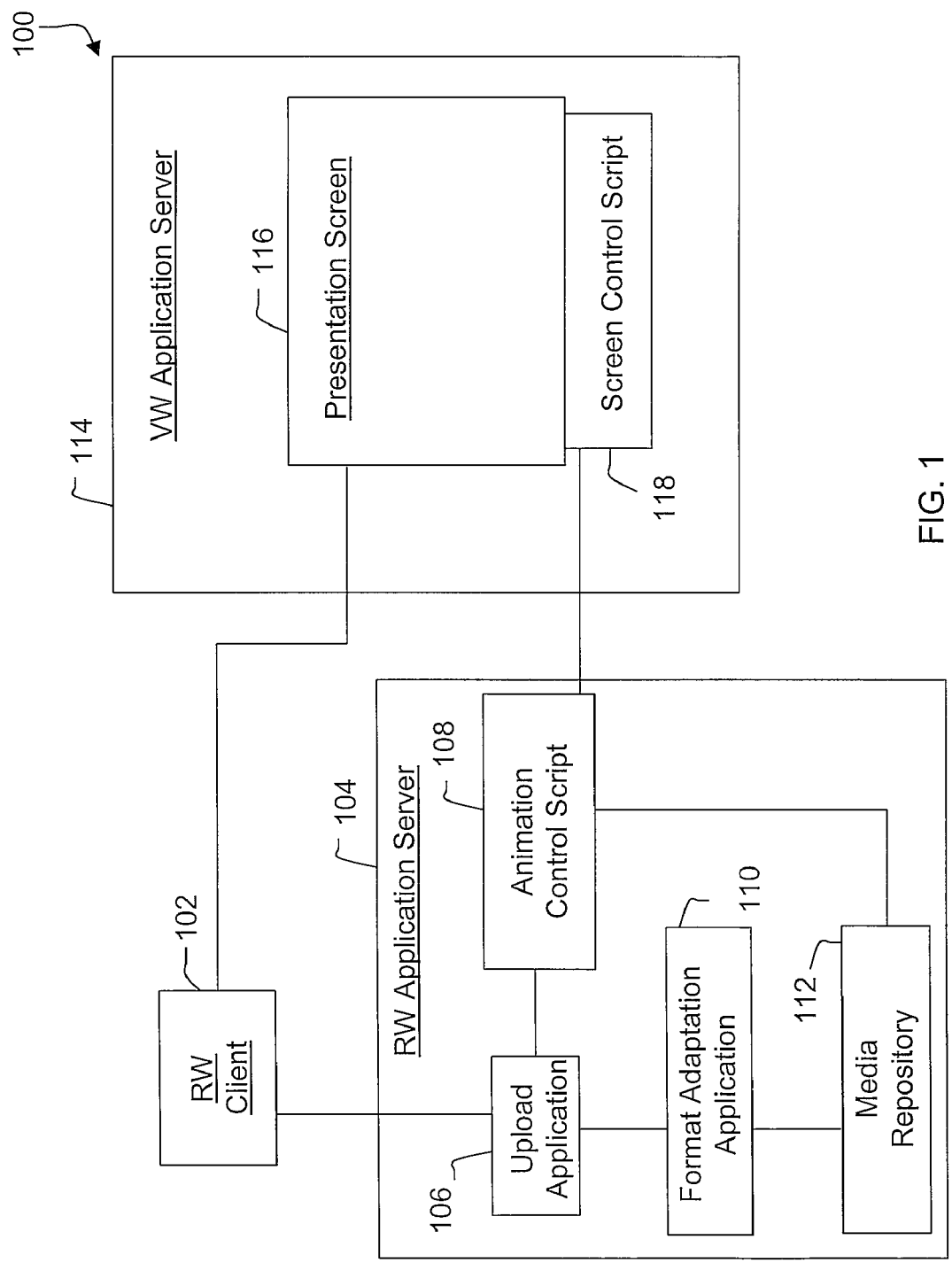
FIG. 1 is a block diagram of an example computer network that may be configured to provide a virtual-world (VW) presentation according to various aspects of the present disclosure.

As will be appreciated by one of ordinary skill in the art, the present invention may be embodied as a method, system, or computer program product. Accordingly, the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer-usable or computer-readable medium may be utilized. The computer-usable or computer-readable medium may be, for example, but is not limited to, an electronic, magnetic, optical, electromagnetic, infrared, or semiconductor system, apparatus, or device. More specific examples (a non-exhaustive list) of the computer-readable medium include: a portable computer diskette, a hard disk, a random access memory (RAM), a read-only memory (ROM), an erasable programmable read-only memory (EPROM) or Flash memory, a portable compact disc read-only memory (CD-ROM), an optical storage device, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, or store the program for use by or in connection with an instruction execution system, apparatus, or device.

Computer program code for carrying out operations of the present invention may be written in an object oriented programming language, such as Java, Smalltalk, C++, etc. However, the computer program code for carrying out operations of the present invention may also be written in conventional procedural programming languages, such as the "C" programming language or similar programming languages. The program code may execute entirely on a single computer, on multiple computers that may be remote from each other, or as a stand-alone software package. When multiple computers are employed, one computer may be connected to another computer through a local area network (LAN) or a wide area network (WAN), or the connection may be, for example, through the Internet using an Internet service provider (ISP).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the functions/acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus implement the functions/acts specified in the flowchart and/or block diagram block or blocks.

In general, a virtual world (VW), such as Second Life™, attempts to attract individuals and companies to create a virtual presence within the VW in order to generate revenue, e.g., advertising revenue. Traditionally, a VW presentation has been created by applying textures on an object that functions as a presentation screen (i.e., a presentation screen object). In a typical implementation, a VW presentation has employed a script that has facilitated switching (slide by slide) back and forth between textures that are maintained in a presentation screen inventory. Traditionally, a VW presentation has been derived from a real-world (RW) presentation, e.g., an OpenOffice Impress™ presentation or a Microsoft PowerPoint™ presentation. Usually, slides of an RW presentation are exported as pictures, which are uploaded to a VW application server and applied to a presentation screen object for display. While deriving a VW presentation from an RW presentation as described above is usually adequate for VW presentations that have a sufficient lead time, the above-described approach is not normally ideal for providing additional presentation materials during an on-going virtual meeting.

According to various aspects of the present disclosure, techniques for providing additional presentation materials in a VW presentation (that is derived from an RW presentation) are disclosed that readily facilitate providing the additional presentation materials during an on-going virtual meeting. For example, a media implementation of one known VW application allows replacing a given texture on an object with content of a media item retrieved from a location specified by a universal resource locator (URL). In this known VW application, videos are played by replacing a texture of an object with content of a QuickTime™ compatible media item. This VW also allows displaying various types of pictures (e.g., pictures provided as JPEG, PNG, or GIF files) by replacing a texture of an object with content of the QuickTime™ compatible media item. According to various aspects of the present disclosure, media capabilities of a VW application may be used to facilitate providing additional presentation materials during an on-going virtual meeting, as contrasted with providing the additional presentation materials as exported pictures that are transferred as textures onto an object (that functions as a display screen).

According to various aspects of the present disclosure, pictures may be exported from an RW presentation and stored on an RW media server. An export format may correspond to a print format (e.g., a portable data file (PDF) or Postscript print format) or a series of images, e.g., one image per slide. Alternatively, a container file format (e.g., ZIP, RAR, etc.) may be employed to upload a series of files to a media server. A screen control script (included in a presentation RW screen object) of a VW may then be employed to set a media URL of a parcel (location where the presentation screen object resides) to the media URL (instead of using textures). In general, the techniques disclosed herein facilitate: uploading of additional presentation material for an on-going virtual meeting in a timely manner; augmentation of presentation materials with voice for stand-alone or unattended presentations in a VW; and creation of interactive animations which allow an avatar in a VW to navigate through a demonstration based on avatar interaction with the demonstration.

Initially, an existing presentation is converted, if required, to a format understood by a media player, e.g., a QuickTime™ media player, that is utilized by a VW application. The conversion can take place on a real-world (RW) client (e.g., a desktop or laptop computer system) or remotely at a media server, depending on a preference of a user and availability of appropriate conversion tools. Typical presentation software that executes on a desktop computer system is capable of exporting into a document using a format that is understood by applications other than the application that created the presentation. For example, presentation content may be printed as Postscript and PDF formatted documents, or particular pages may be exported as pictures. The exported documents can then be uploaded to a media server as single files or packed and/or compressed in some container format. As used herein, the term "upload" includes transferring information to the media server in various manners, e.g., as part of a web form or as an email.

In one or more embodiments, a media server includes a format adaptation application that converts an uploaded media item into a target format for a target VW. For example, utilities like ImageMagick™ are able to convert one graphics format into another and may be used to convert Postscript or PDF print files to a series of JPEG pictures, which can be accessed using a URL from a VW application and then displayed in-world. As another example, applications such as MPlayer™ and FFmpeg™ may be used to convert from one video format into another. The media item may then be stored in a media repository. In one or more embodiments, a VW screen control script may be employed to set a VW media URL of a screen parcel to an RW URL of an RW media item (stored in an RW media repository). In this manner, an RW media item may be readily displayed on multiple RW clients associated with various participants of a virtual meeting.

In the event that an individual needs to provide additional presentation materials for an on-going virtual meeting, the above approaches may be utilized to upload exported presentation slides and an indication of a target presentation screen object to an upload application in a media server. Conversion of individual slides to a format understood by a media player (if needed) may be performed by the format adaptation application, which may also be configured to create an associated RW animation control script. In a typical implementation, the animation control script includes a list of media items that are associated with a VW presentation screen object. In one or more embodiments, the animation control script is implemented as a text-based set of instructions to the screen control script.

To simplify the screen control script, an animation production application may be employed on the media server to create a simple text file with commands for the screen control script. The animation production application may be employed to facilitate the use of light-weight desktop clients and support creation of animation control scripts by an RW individual. For example, an extensible mark-up language remote procedure call (XML RPC) may be employed to inform the screen control script (that is executing in conjunction with a presentation screen object) about a new animation control script. In this case, the screen control script may issue a hyper-text transfer protocol (HTTP) request to read a list of media items associated with the animation control script. In general, a screen control script may be configured to indicate (to a VW avatar) that additional presentation material is available for the presentation screen object and offer to select one of the media items for display.

According to another aspect of the present disclosure, presentation material may be augmented with sound (e.g., recorded voice), e.g., for stand-alone or unattended VW presentations. An individual that is creating a presentation that includes sound may provide visual media as mentioned above (and/or add other materials) in conjunction with audio media. In general, unattended VW presentations (demonstrations) share similarities with movies. However, demonstrations are usually subdivided into scenes (chapters), where a scene is one slide, a series of slides, or a piece of movie, which, once started, is intended to run from start to end. A demonstration can be viewed as a sequence of scenes, each of which is intended to cover a subtopic of a presentation. A next scene may be initiated through, for example, avatar interaction with the presentation screen or after a timeout. A user may define a picture order, a picture display time, and an underlying audio file in a number of different manners, e.g., using an application that executes on a client computer system or on a media server. In this case, the application outputs a movie file (or files) in a format compatible with an implemented media player.

According to one aspect of the present disclosure, a technique for providing presentation material in a virtual-world (VW) meeting includes converting a real-world (RW) presentation into a VW presentation, such that a media format of the VW presentation corresponds to the media format utilized by a target VW. The VW presentation (e.g., including one or more slides) is then stored in an RW media repository. The VW presentation is associated with an RW media uniform resource locator (URL). A VW screen control script is used to set a VW media URL of a VW screen parcel to the RW media URL. The VW presentation is then provided to participants of the VW meeting by retrieving the VW presentation from the RW media repository using the VW media URL.

With reference to FIG. 1, a system 100 includes an RW client 102 (which may include, for example, one or more computer systems that are executing browsers) that is coupled (via, for example, an Internet connection and one or more Internet service providers (ISPs)) to a VW application server 114 and an RW application server 104. A VW presentation may be initiated in-world or via the client 102. An avatar or a user of the client 102 may select a presentation or a demonstration that is defined by media that is stored in an RW media repository 112. Media, for a VW presentation, provided from the client 102 may be filtered (or passed) through an upload application 106 and a format adaptation application 110. The upload application 106 is also in communication with an animation control script 108, which is communication with the media repository 112 and a VW screen control script 118. The screen control script 118 is included within a presentation screen object 116 that provides a presentation screen, which is utilized to provide a VW presentation to the client 102. While only one client is depicted in FIG. 1, it should be appreciated that multiple RW clients may configured to receive a VW presentation (via the presentation screen object 116) based on the presentation screen during a virtual meeting.

With reference to FIG. 2, a diagram 200 illustrates an example of how an RW individual may utilize an application to integrate visual and audio information to create scenes. In the diagram 200, an application that creates the demonstration converts still images and sound files into a format understood by an implemented media player by merging sound (i.e., recorded voice) with a series of slides (i.e., slides S1-S7) according to input provided by an RW individual. The application may also be used to create an associated animation control script that includes instructions related to scenes in the demonstration. In this case, the demonstration is generally provided as a general demonstration item and is not usually assigned to a particular VW presentation screen object. If the demonstration is chosen to be shown on a particular VW presentation screen, a user associates presentation media in a media repository with the presentation screen object. As a result of the association, the presentation screen object is informed of the availability of the new media, similar to how the availability of additional presentation material for an on-going virtual meeting occurs. In any case, the screen control script is configured to download appropriate animation control scripts and execute the commands therein.

According to another aspect of the present disclosure, a demonstration is configured to provide an interactive experience using interactive animation. As used herein, the term 'interactive animation' means that an avatar influences scene order of a demonstration. In general, scenes are pieces of displayed media with a defined beginning and end. After each scene, an avatar determines a next scene for the demonstration. A series of scenes may be created using the techniques discussed above. According to one embodiment, a VW presentation screen is configured to detect an area-sensitive interaction with an avatar. The term 'area-sensitive', as used herein, describes the ability to report on which area of a whole screen an interaction with an avatar takes place.

In general, each scene is allowed to continue (following detection of an area-sensitive interaction) to its natural termination and a next scene is based on where an avatar most recently touched the presentation screen. Typically, an animation control script is configured to provide information (e.g., a media item URL, a timeout value, a next scene target after timeout, and a series of area descriptions on a presentation screen) about a scene that is to be executed. A screen control script is configured to load a next media item (which is based on whether a scene times out or an avatar 'touches' a certain area on the screen) onto a presentation screen object.

Figure 3:
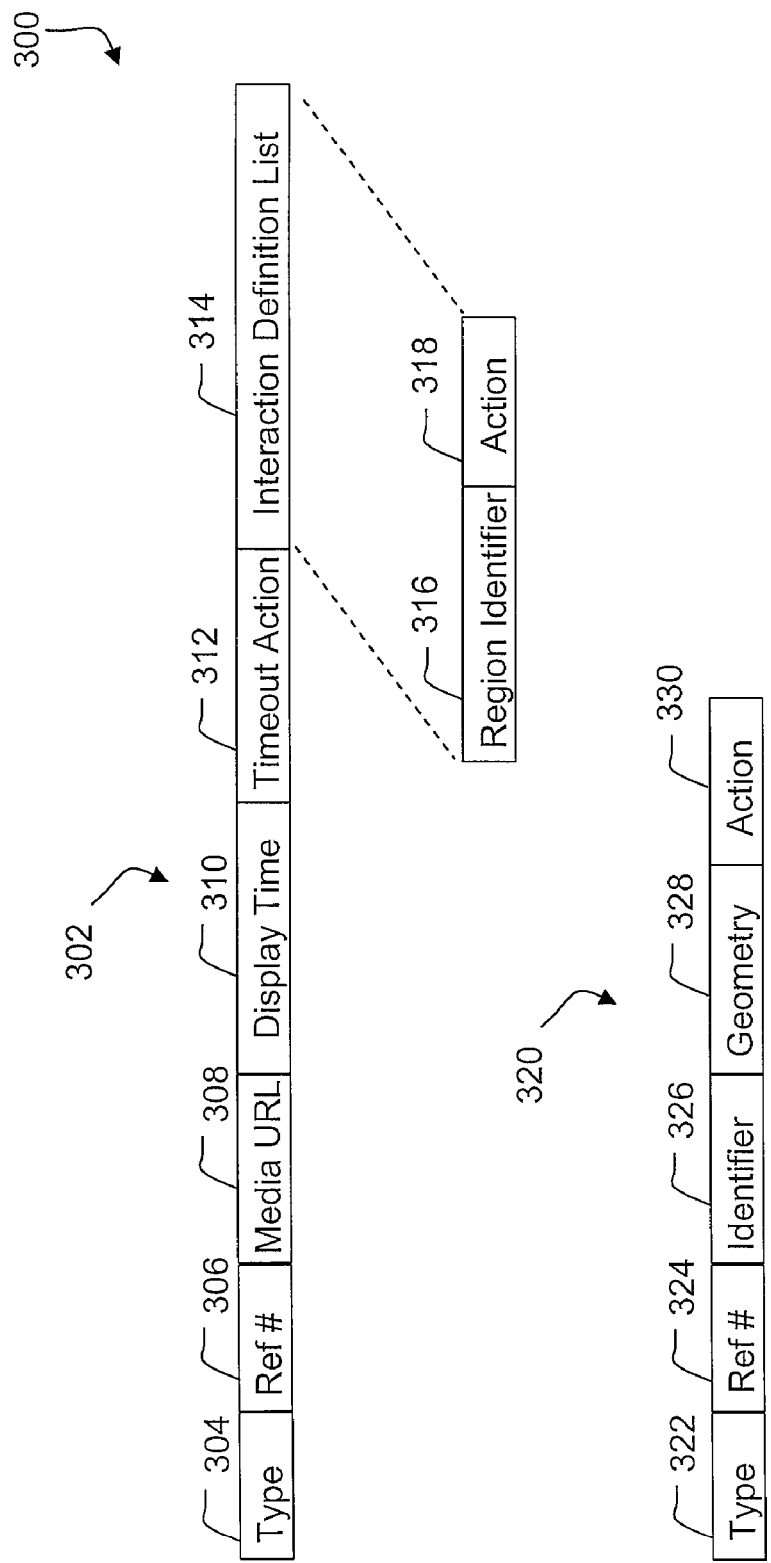
FIG. 3 is a diagram that depicts example fields of two example animation control scripts according to various aspects of the present disclosure.

With reference to FIG. 3, a diagram 300 depicts fields of two example animation control scripts. It should be appreciated that the fields may be extended if additional functionality is desired and additional animation control scripts may be employed. A media descriptor script 302 includes fields 304, 306, 308, 310, 312, and 314, which is subdivided into fields 316 and 318. Similarly, a region descriptor script 320 includes fields 322, 324, 326, 328, and 330. The field 304 serves to distinguish various script types, e.g., a media descriptor script type and a region descriptor script type. The field 306 serves as a reference number (point) for later actions (e.g., after a timeout has triggered the reference point may refer to a next media item to be displayed). The field 308 provides a media URL that is set by a screen control script as a parcel attribute. The field 310 denotes a time (in seconds) a certain media item is displayed.

After expiration of the time specified by field 310, the screen control script proceeds to a timeout action included in the field 312. The field 314 includes an interaction definition list which may be used to build interactive demonstrations. The field 314 includes a region identifier in the field 316 and an action in the field 318. The region identifier defines a geometry for an avatar interaction in terms of where on a presentation screen an avatar touches and the action includes a number of a media descriptor script to load if the region is touched by an avatar. The media descriptor script 302 may, for example, include a line of delimited text (e.g., 1;1;http://server/path/media.ext;5;1).

The region descriptor script 320 includes a type in the field 322 and a reference number in the field 324 that that indicates a continuous number. The script 320 also includes an identifier in the field 326 that identifies a region and a geometry in the field 328 that defines which part of the presentation screen is covered by the region. If the presentation screen is touched in the region (named in the field 326), the screen control script continues with a media descriptor number noted in the field 330 (action). The region descriptor script 320 may also include a line of delimited text (e.g., a line of delimited text for a region denoted 'okbtn' may be given as '2;1;okBtn;10× 10+710+563;3' and a line of delimited text for a region denoted 'cancelBtn' may be given as '2;2;cancelBtn;10×10+ 20+20;4').

In various implementations, the presentation screen includes an object (i.e., a presentation screen object) with corresponding media texture on one surface and an associated screen control script. Each touch-aware region on a presentation screen (defined by an animation control script) is represented by a transparent object (button) which has two dimensions, as defined by a region descriptor and a default thickness (e.g., 1 cm, which is the lowest thickness in Second Life™). Transparent buttons, which are created on demand by a screen control script, are placed on a surface of the presentation screen and are moved (according to the animation control script) by the screen control script to a correct position. When an avatar touches the transparent buttons, the touching is detected and intercepted by the screen control script.

The screen control script receives the animation control script and interprets the contents of the animation control script. The animation control script may create invisible objects which define a region (as described above), set the media URL for an associated screen parcel to a value in the media descriptor entry, and respond to defined timeouts and avatar touch actions. In various embodiments, the screen control script communicates with the transparent buttons to determine if an avatar has touched a particular area on the screen. The screen control script may link the transparent buttons with a root primitive object (prim) and use a message call (e.g., an IlLinkedMessage call from the Linden scripting language (LSL)) or define a channel for unlinked prims to communicate with the screen control script (e.g., using an llListen/llSay LSL calls).

Figure 4:
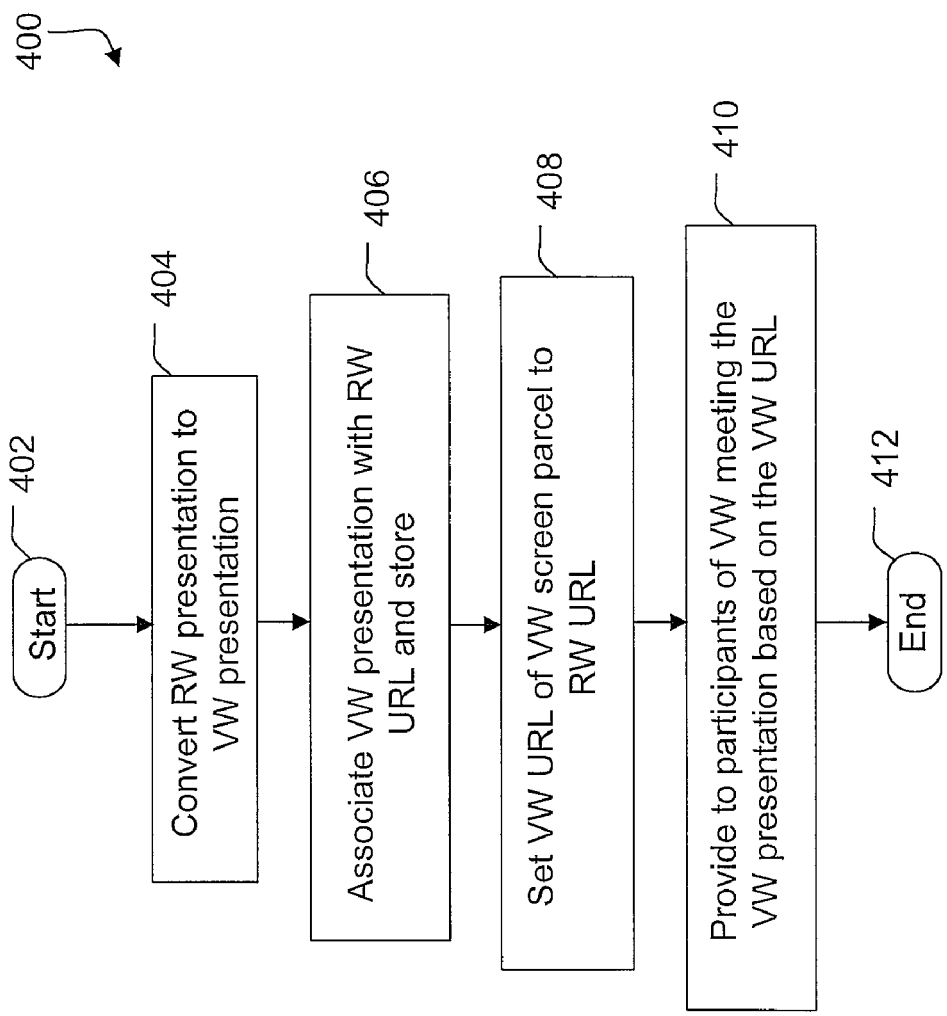
FIG. 4 is a flow chart of a process for providing additional presentation materials during an on-going virtual meeting according to one embodiment of the present disclosure.

Turning to FIG. 4, a process 400 for providing a VW presentation is initiated in block 402, at which point control transfers to block 404. In block 404, one or more images from a real-world (RW) presentation are converted to a virtual-world (VW) presentation (e.g., a media format that is compatible with a VW media player). Next, in block 406, the VW presentation is associated with an RW media uniform resource locator (URL) and stored in a media repository. Then, in block 408, a VW media URL of a VW screen parcel is set to the RW media URL. Next, in block 410, the VW presentation is provide to participants of a VW meeting based by accessing the RW media repository using the VW media URL. Following block 410, control transfers to block 412 where the process 400 terminates.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of providing presentation material in an on-going virtual meeting, comprising:

converting a real-world presentation into a virtual-world presentation, wherein a media format of the virtual-world presentation corresponds to a media format utilized by a target virtual-world;

storing the virtual-world presentation in a real-world media repository, wherein the virtual-world presentation is associated with a real-world media uniform resource locator;

setting, using a virtual-world screen control script, a virtual-world media uniform resource locator associated with a virtual-world screen parcel to the real-world media uniform resource locator; and providing, to participants of the virtual-world meeting, the virtual-world presentation by accessing the real-world media repository using the virtual-world media uniform resource locator.

* * * * *